United States Patent
Randolph

(10) Patent No.: US 12,263,052 B2
(45) Date of Patent: *Apr. 1, 2025

(54) PROPHY ANGLE WITH TRANSLATING PADDLE SYSTEM AND METHOD FOR METERED DISPENSING OF A PROPHYLAXIS MEDIUM WITH TACTILE FEEDBACK

(71) Applicant: Bradley A. Randolph, Burlington, IA (US)

(72) Inventor: Bradley A. Randolph, Burlington, IA (US)

( * ) Notice: Subject to any disclaimer, the term of this patent is extended or adjusted under 35 U.S.C. 154(b) by 389 days.

This patent is subject to a terminal disclaimer.

(21) Appl. No.: 16/900,894

(22) Filed: Jun. 13, 2020

(65) Prior Publication Data

US 2020/0352690 A1 Nov. 12, 2020

Related U.S. Application Data

(63) Continuation-in-part of application No. 16/259,447, filed on Jan. 28, 2019, now abandoned, which is a continuation-in-part of application No. 12/337,899, filed on Dec. 18, 2008, now Pat. No. 10,206,758.

(60) Provisional application No. 62/861,735, filed on Jun. 14, 2019, provisional application No. 61/038,944, filed on Mar. 24, 2008.

(51) Int. Cl.
*A61C 17/00* (2006.01)
*A61C 17/22* (2006.01)

(52) U.S. Cl.
CPC .......... *A61C 17/005* (2013.01); *A61C 17/227* (2013.01)

(58) Field of Classification Search
CPC ......... A61C 1/12; A61C 17/005; A61C 17/16; A61C 17/22; A46B 9/005
See application file for complete search history.

(56) References Cited

U.S. PATENT DOCUMENTS

| | | | |
|---|---|---|---|
| 2,300,828 A | 11/1942 | Goldenberg | |
| 5,062,796 A * | 11/1991 | Rosenberg | A61C 17/005 433/125 |
| 5,642,994 A | 7/1997 | Chipian et al. | |
| 5,871,353 A | 2/1999 | Pierce et al. | |
| 5,911,577 A | 6/1999 | Henrikson | |
| 6,164,967 A * | 12/2000 | Sale | A61C 17/227 433/80 |
| 6,257,886 B1 * | 7/2001 | Warner | A61C 17/005 433/125 |
| 6,632,090 B1 | 10/2003 | Randolph | |
| 6,902,397 B2 | 6/2005 | Farrell et al. | |
| 7,070,412 B2 | 7/2006 | Stadeker | |
| 7,338,285 B1 | 3/2008 | Balaban | |
| 7,510,396 B2 * | 3/2009 | Lee | A61C 17/005 433/125 |
| 10,206,758 B2 * | 2/2019 | Randolph | A61C 17/005 |
| 2006/0246395 A1 | 11/2006 | Pond | |
| 2007/0111159 A1 | 5/2007 | Stadeker | |

(Continued)

*Primary Examiner* — Ralph A Lewis
(74) *Attorney, Agent, or Firm* — Simmons Perrine Moyer Bergman PLC

(57) ABSTRACT

A disposable prophy angle with an accessible and replaceable internal collapsible prophylaxis cartridge and a push button and plunger/paddle combination to force a metered amount of prophylaxis medium into the prophy angle while providing audible and/or tactile feedback.

4 Claims, 19 Drawing Sheets

(56) References Cited

U.S. PATENT DOCUMENTS

2008/0261171 A1    10/2008   Michaelian
2008/0311541 A1    12/2008   Carron et al.

\* cited by examiner

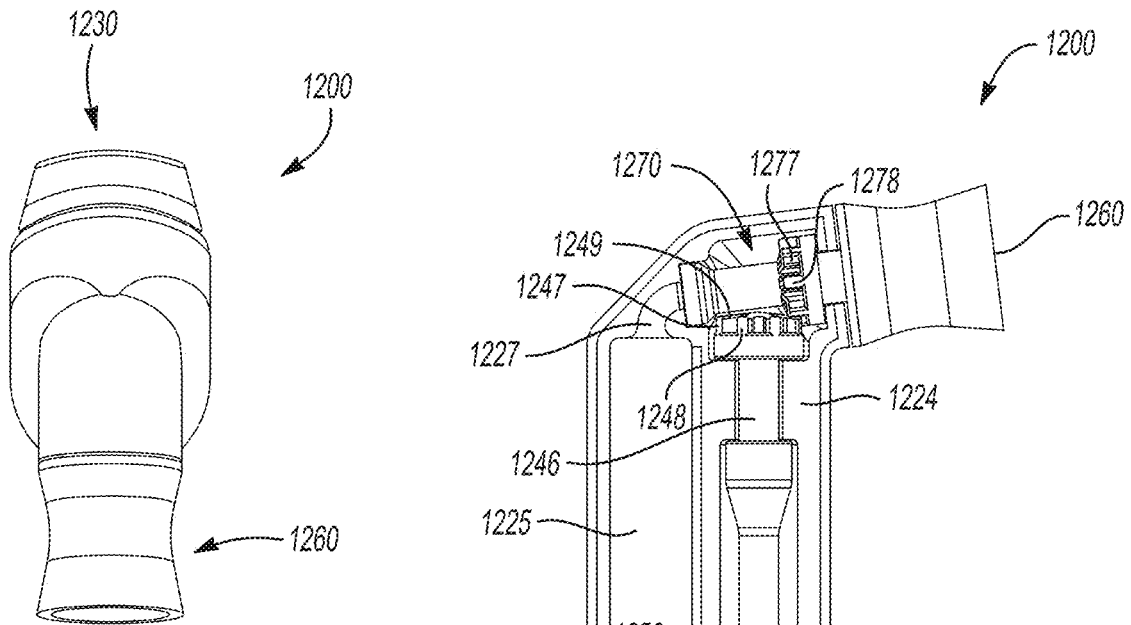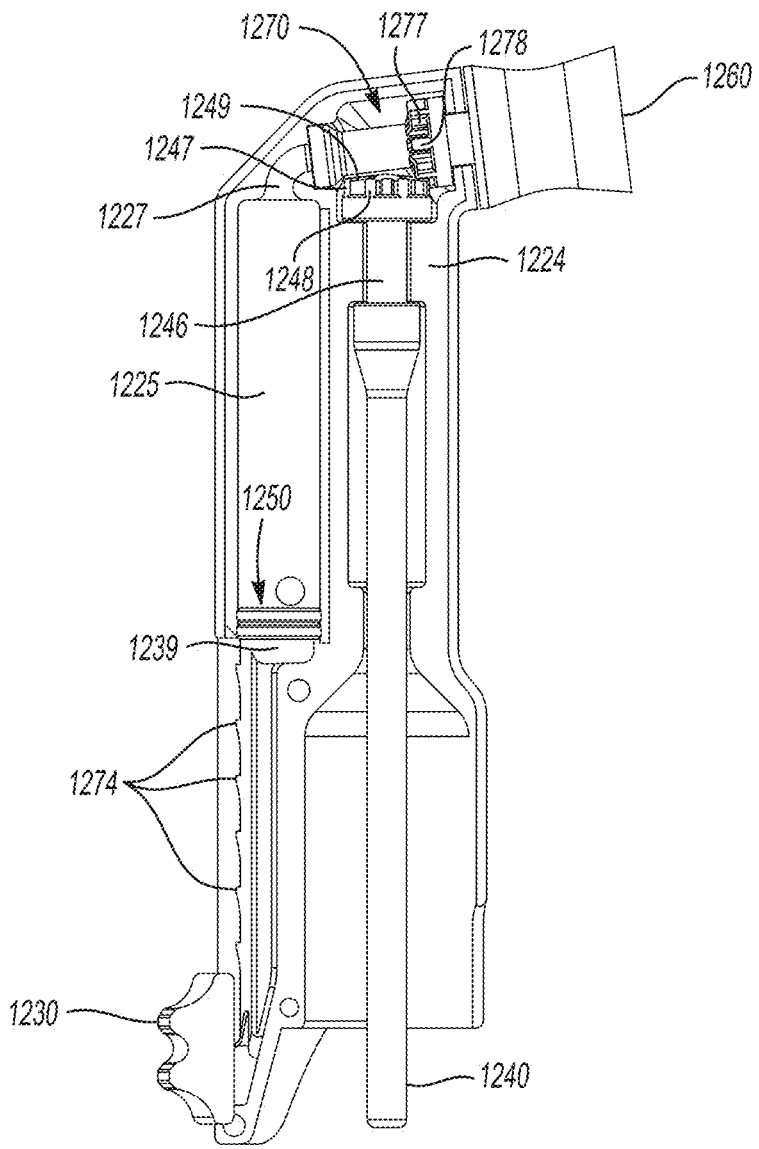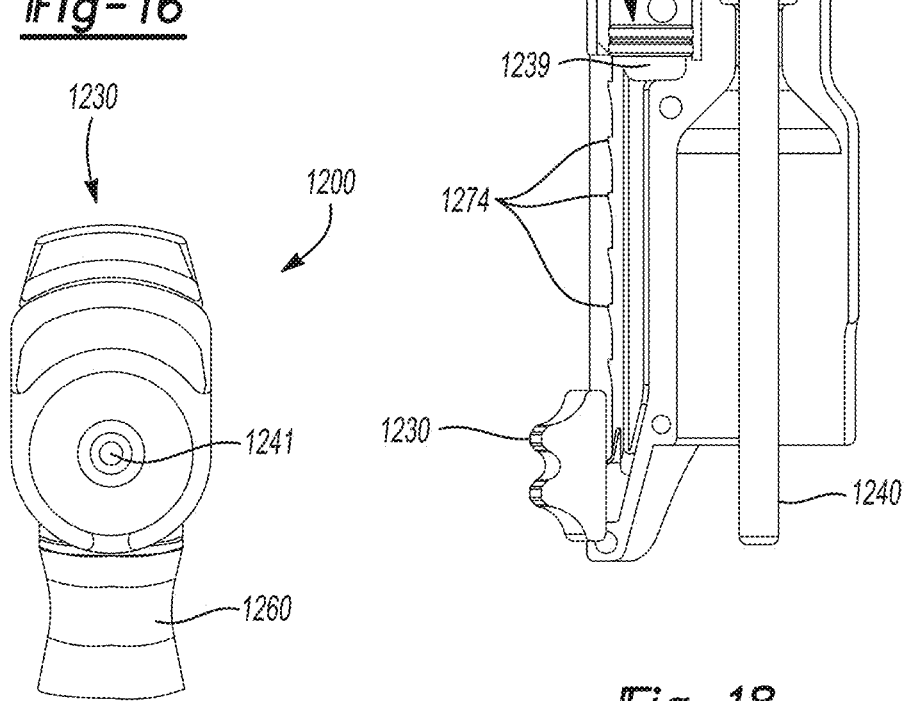
*Fig-16*
*Fig-17*
*Fig-18*

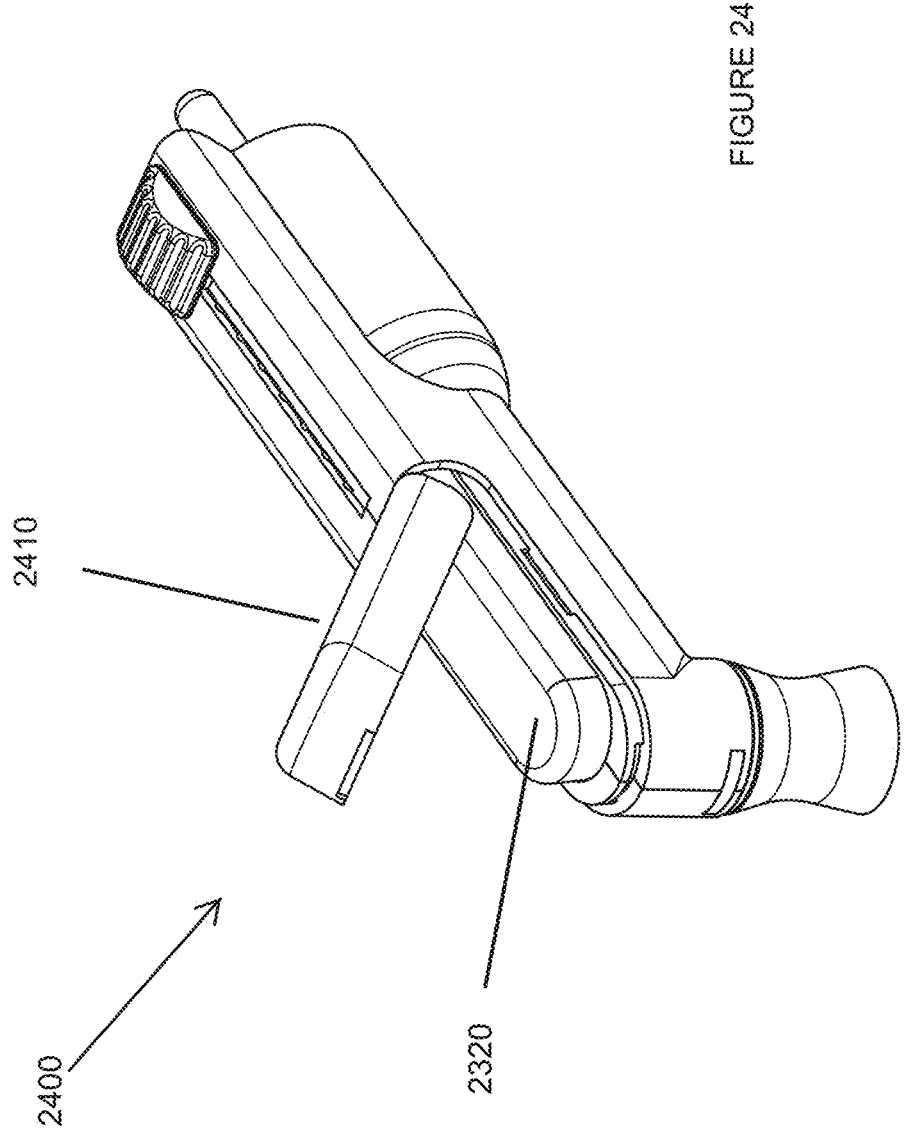

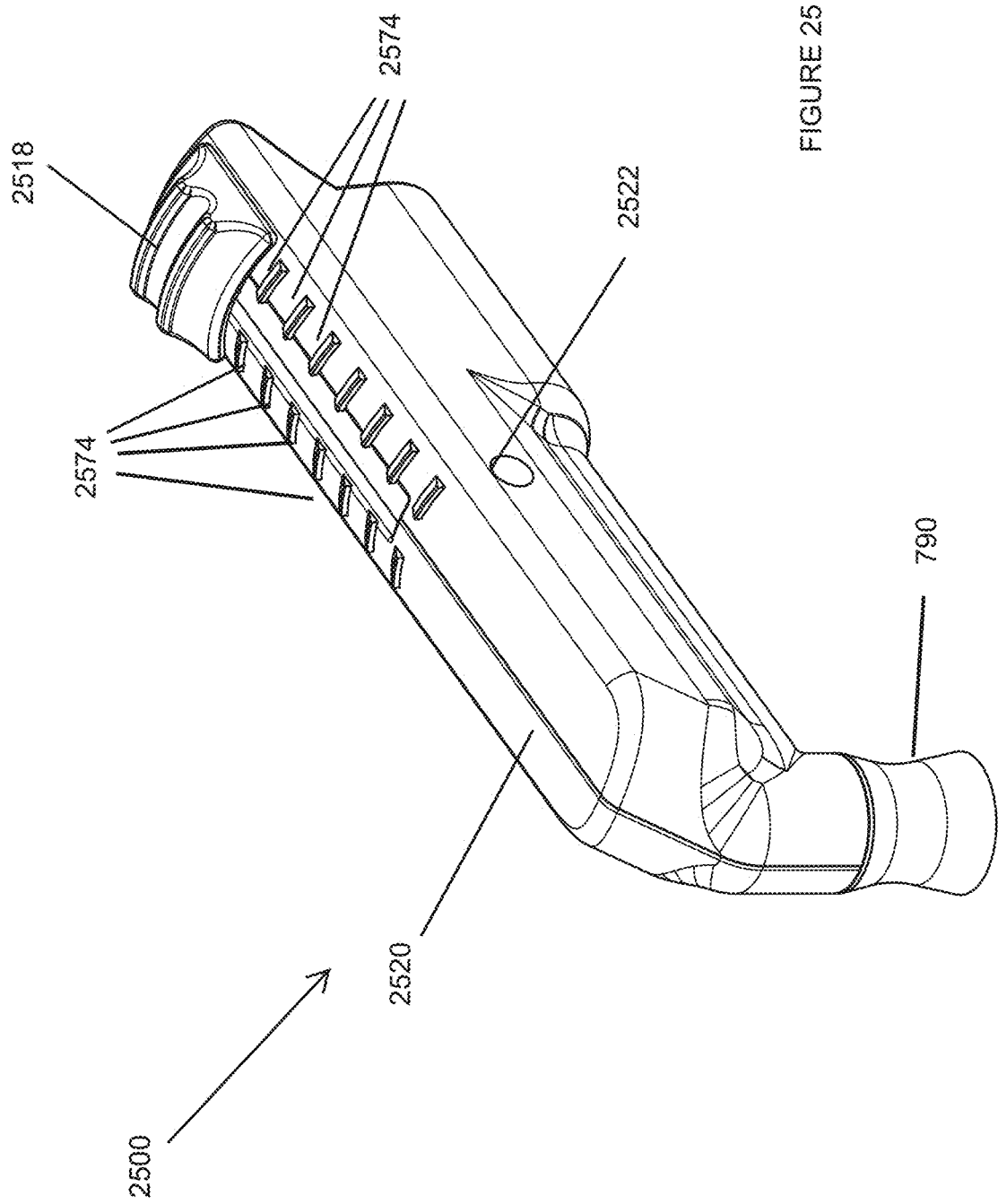

PROPHY ANGLE WITH TRANSLATING PADDLE SYSTEM AND METHOD FOR METERED DISPENSING OF A PROPHYLAXIS MEDIUM WITH TACTILE FEEDBACK

CROSS REFERENCE TO RELATED APPLICATIONS

The present application claims the benefit of the filing date of a provisional application having Ser. No. 62/861,735 filed on Jun. 14, 2019 and is a continuation-in-part of the application having Ser. No. 16/259,447 filed on Jan. 28, 2019, which was a continuation in part of non-provisional patent application having Ser. No. 12/337,889 filed on Dec. 18, 2008, now issued U.S. Pat. No. 10,206,758 issued on Feb. 29, 2019, which non-provisional application claims the benefit of the filing date of provisional patent application having Ser. No. 61/038,944 filed on Mar. 24, 2008 by the same inventor, which applications are incorporated herein in their entirety by this reference.

FIELD OF THE INVENTION

The present invention generally relates to prophy angles used in dentistry.

BACKGROUND OF THE INVENTION

Devices that help aid in the professional cleaning or polishing of teeth have been around the industry for years. These devices have been generally known as prophy angles. Prophy angles have been through various stages of development and improvement from re-usable to disposable. Currently within the industry, the disposable angle has enjoyed much success due to its low cost, simplification and most importantly, single use which virtually eliminates cross contamination risk to patient and provider. The downfall of current delivery systems requires the use of a separate dentifrice to complete the task, thus creating a loss of efficiency, increase in overall costs and packaging, and ultimately an increase in risk to patient and provider to contamination. More recent developments in prophy angle design have attempted to incorporate the prophylaxis medium within the prophy angle. These presentations have utilized varying designs from auger/baffle to piston U.S. Pat. No. 5,871,353 to plunger U.S. Pat. No. 6,257,886 to systems that utilize a threaded shaft and spring loading U.S. Pat. Nos. 6,902,397, and 6,632,090. All of these systems force the dentifrice to occupy the bulk of the prophy angle housing. All designs have shown to be somewhat complex, creating cost and difficulty becoming implemented within the market place. One more recent design attempts to offset the drive shaft to allow for less complexity in delivery U.S. Pat. No. 7,070,412. However, persistent deficiencies in prior art designs have failed to teach a system that will simultaneously allow for incorporation of a prophylaxis medium into the prophy angle, allow for its controlled dispensing with both tactile and aural feedback regarding amount and rate of dispensing, and be simplistic enough in design to adapt to the marketplace.

Consequently, there exists a need for improved methods and systems for cost effectively delivering a prophylaxis medium through a prophy angle.

SUMMARY OF THE INVENTION

It is an object of the present invention to provide a system and method for dispensing prophylaxis medium in an efficient manner.

It is a feature of the present invention to utilize an internally integrated collapsible cartridge pre-filled with prophylaxis medium, together with a translatable push button and a connected plunger or paddle.

It is another feature of the present invention to include a series of ridges for engaging with the push button and metering delivery of prophylaxis medium while simultaneously preventing "back-peddling" of the push button.

It is another feature of the present invention to provide a chamber into which a collapsible cartridge can be securely dropped and laterally retained therein during the insertion process.

It is still another feature of the present invention to provide a secondary means of providing prophylaxis medium in a cartridge-less design whereby the enclosed reservoir is bulk filled through a port that accesses the reservoir chamber.

It is yet another feature of the present invention to provide a combination of a push button and ridges being so configured that a tactile feel and/or audible "click" or other indication occurs each time the plunger/paddle is advanced to a new forward location.

It is an advantage of the present invention to provide a relatively inexpensive easy-to-use prophy angle with an integrated prophylaxis delivery mechanism.

The present invention is designed to satisfy the aforementioned needs, provide the previously stated objects, include the above-listed features, and achieve the already articulated advantages.

Accordingly, the present invention is a system and method including providing a plunger-actuated collapsible prophylaxis cartridge inside a prophy angle housing which provides for relatively inexpensive easy delivery of prophylaxis medium.

BRIEF DESCRIPTION OF THE DRAWINGS

The invention may be more fully understood by reading the following description of the preferred embodiments of the invention, in conjunction with the appended drawings wherein:

FIG. 16 is a front view of the system of FIG. 12.

FIG. 17 is a rear view of the system of FIG. 12.

FIG. 18 is a cut-away side view of the system of FIG. 12 with a first portion removed to reveal internal components.

FIG. 24 is a perspective view of an alternate embodiment of the present invention with an end pivoting cover over a dentifrice cartridge.

FIG. 25 is a perspective view of an alternate embodiment of the present invention without a pivoting cover or a dentifrice cartridge, but with external ridges for feedback notification.

DETAILED DESCRIPTION OF THE INVENTION

Figure 1:
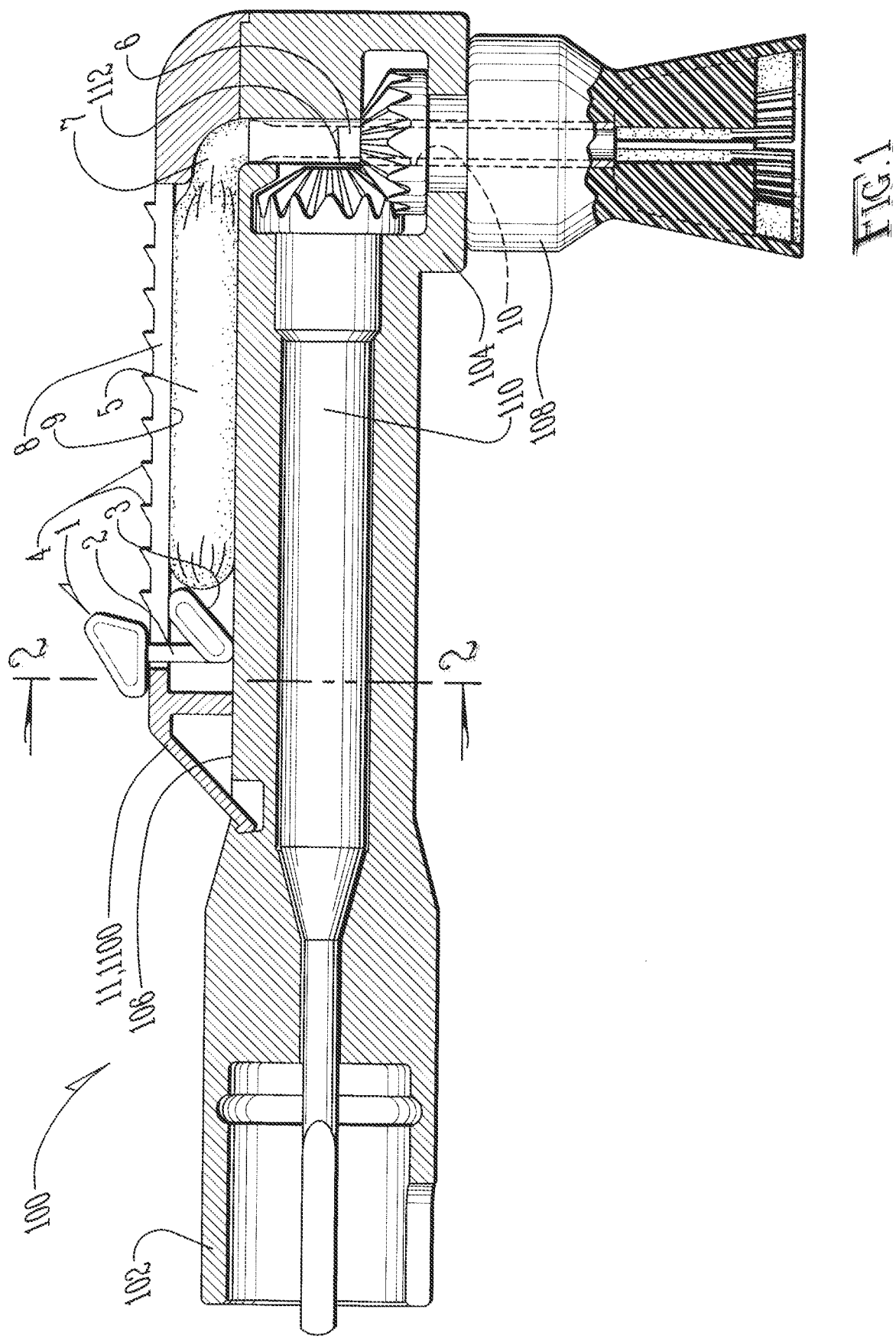
FIG. 1 is a side cutaway view of a prophy angle of the present invention where the vertical dashed line labeled 2-2 is a line along which the cross-sectional view of FIG. 2 was taken.

Now referring to the drawings, wherein like numerals refer to like matter throughout, and more specifically to FIG. 1, there is shown a prophy angle generally designated 100 which can be generally constructed of the same materials and in the same general manner as prior art prophy angles. It should now be noted that in one embodiment, the prophy angle 100 of the present invention need not be a professional device, and the present invention is intended to include rotary and reciprocating toothbrushes as well. Prophy angle 100 may have a drive connection end 102 which would connect to a standardized pneumatic prophy angle drive system (not shown), or other means for driving a plurality of detachable and disposable prophy angles, which system is well known in the art, which could include electrical prophy angle drive systems or self-contained battery-powered handheld prophy angle drive systems or other means for driving a plurality of detachable and disposable prophy angles. Drive connection end 102 could be omitted if the prophy angle 100 were incorporated into a larger device such as a personal electric toothbrush. Opposing drive connection end 102 is cup end 104. Top side 106 of prophy angle 100 is shown with innovative features thereon, such as: push button 1, which could be a plastic material the same as or similar to the prophy angle 100 housing or other suitable material and configuration so as to provide for a tactile interaction between a user's finger or thumb and a paddle or plunger 3 via a connector 2 which transmits force applied by the finger at the push button 1 to the paddle 3 and then into the prophylaxis medium in the collapsible cartridge 5. Collapsible cartridge 5 is disposed under and adjacent to raised ridges 4, which also interact with the push button 1. Collapsible cartridge 5 is coupled to a connecting tube 6, which provides a pathway for prophylaxis medium to flow to the prophy cup 108 or toothbrush. Connecting tube 6 couples to a pathway through the gear head pathway 10 which extends through a central void in the gear head 112. Collapsible cartridge 5 is disposed in a reservoir 7 which is disposed in a raised portion of a housing on or integrated with the housing of the prophy angle 100. A removable housing cap 11 is shown for providing access to the collapsible cartridge 5 in the reservoir 7. Removable housing cap 11 or lid is detachable, but other arrangements, such as a hinged or sliding, or other suitable ways to permit access into the reservoir 7 could also be used. Removable housing cap 11 could be similar to other snap-out or hinged access doors existing in prior art prophy angles.

Collapsible cartridge 5 could be a flexible bag-like cartridge or instead, it could be substituted with a syringe, a plunger or other variable volume structure which can eject matter from therein when a force is applied. Items 8 and 9 are discussed below with respect to FIG. 3.

Figure 2:
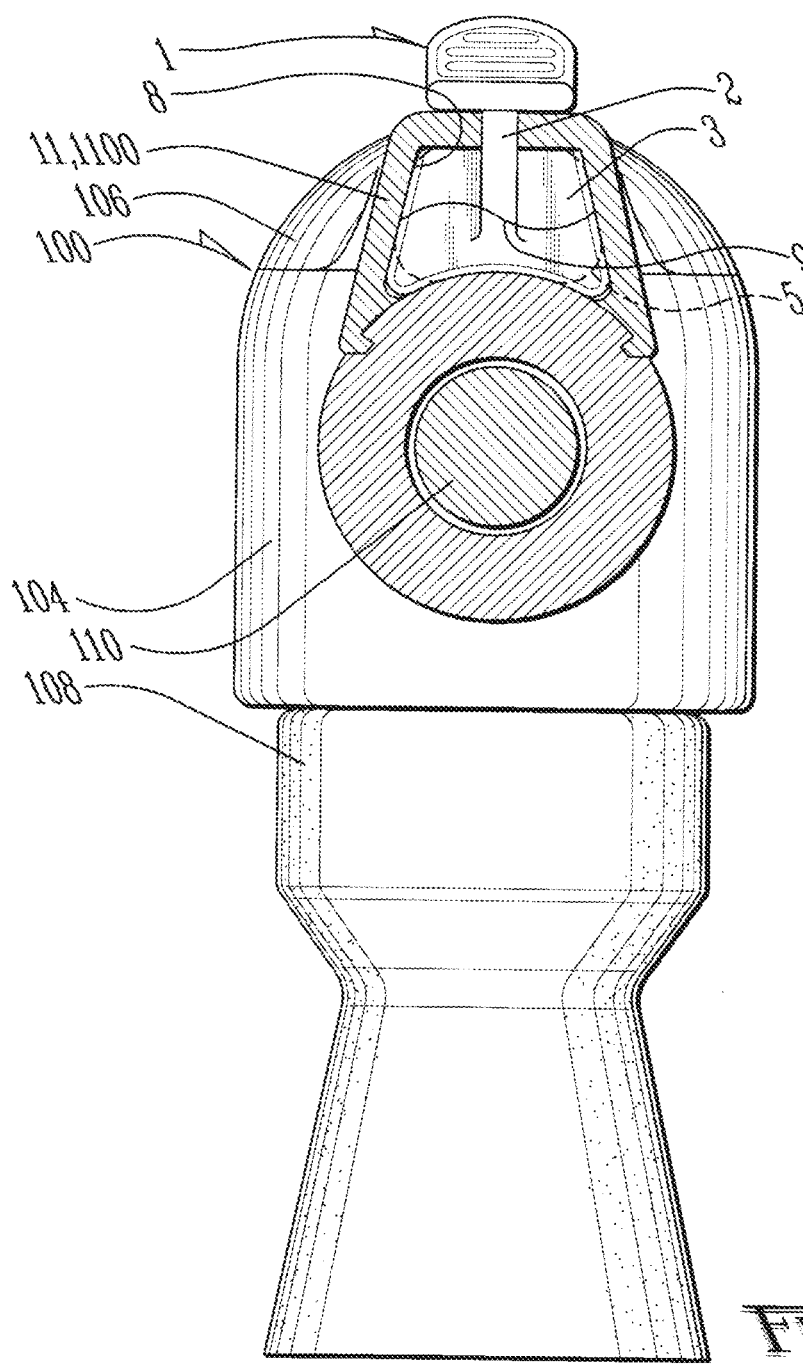
FIG. 2 is a cross-sectional view of the prophy angle of the present invention taken on line 2-2 of FIG. 1.

Now referring to FIG. 2, there is shown a cross-sectional view of the prophy angle 100 taken on line 2-2 of FIG. 1, which shows the drive member 110 which couples at drive connection end 102 to a prophy angle drive system, which is a commercially available product.

Figure 3:
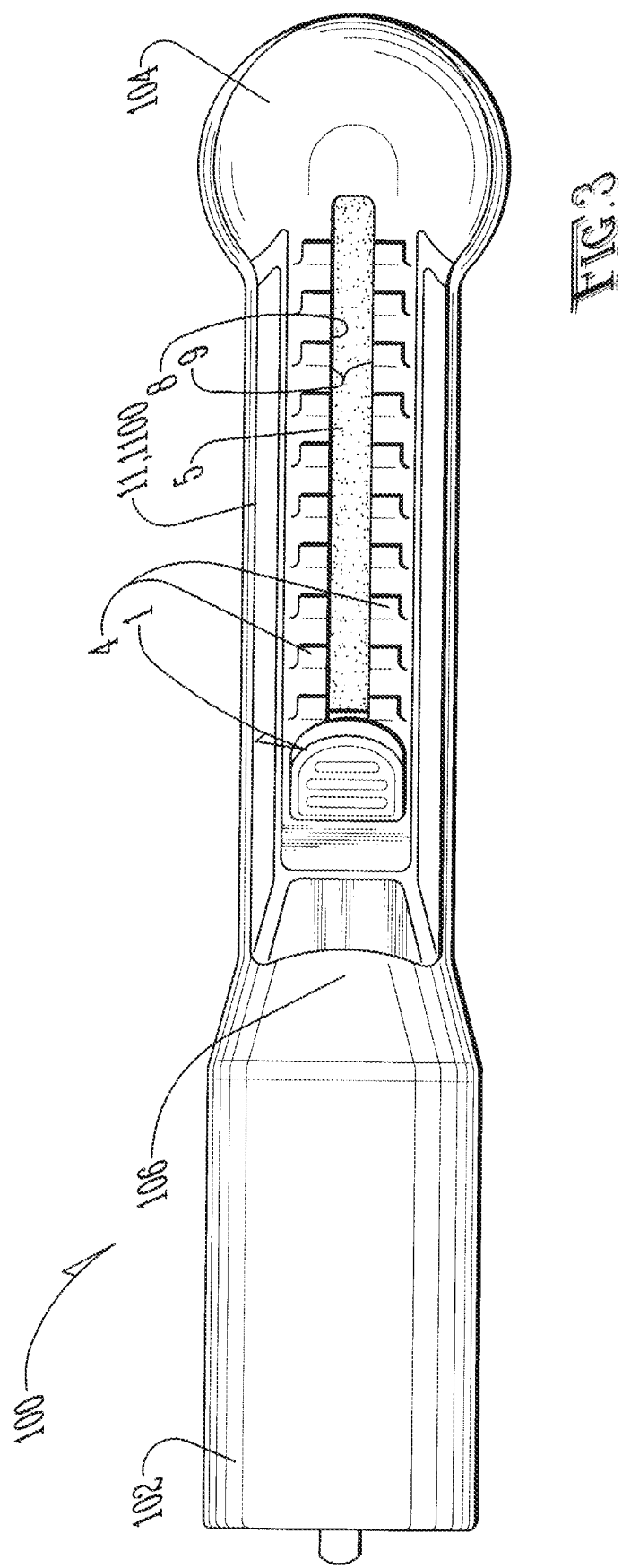
FIG. 3 is a top view of the prophy angle of the present invention.

Now referring to FIG. 3, there is shown a top view of the prophy angle 100 of FIG. 1, which shows cut-out channel 8 in the removable housing cap 11 to reveal the collapsible cartridge top side 9. Raised ridges 4 are shown on either side of the cut-out channel 8. Raised ridges 4 cooperate with the push button 1 to visually, tactilely, and audibly notify a user of the prophy angle 100 of an amount of prophylaxis medium which has been forced out of the collapsible cartridge 5.

Figure 4:
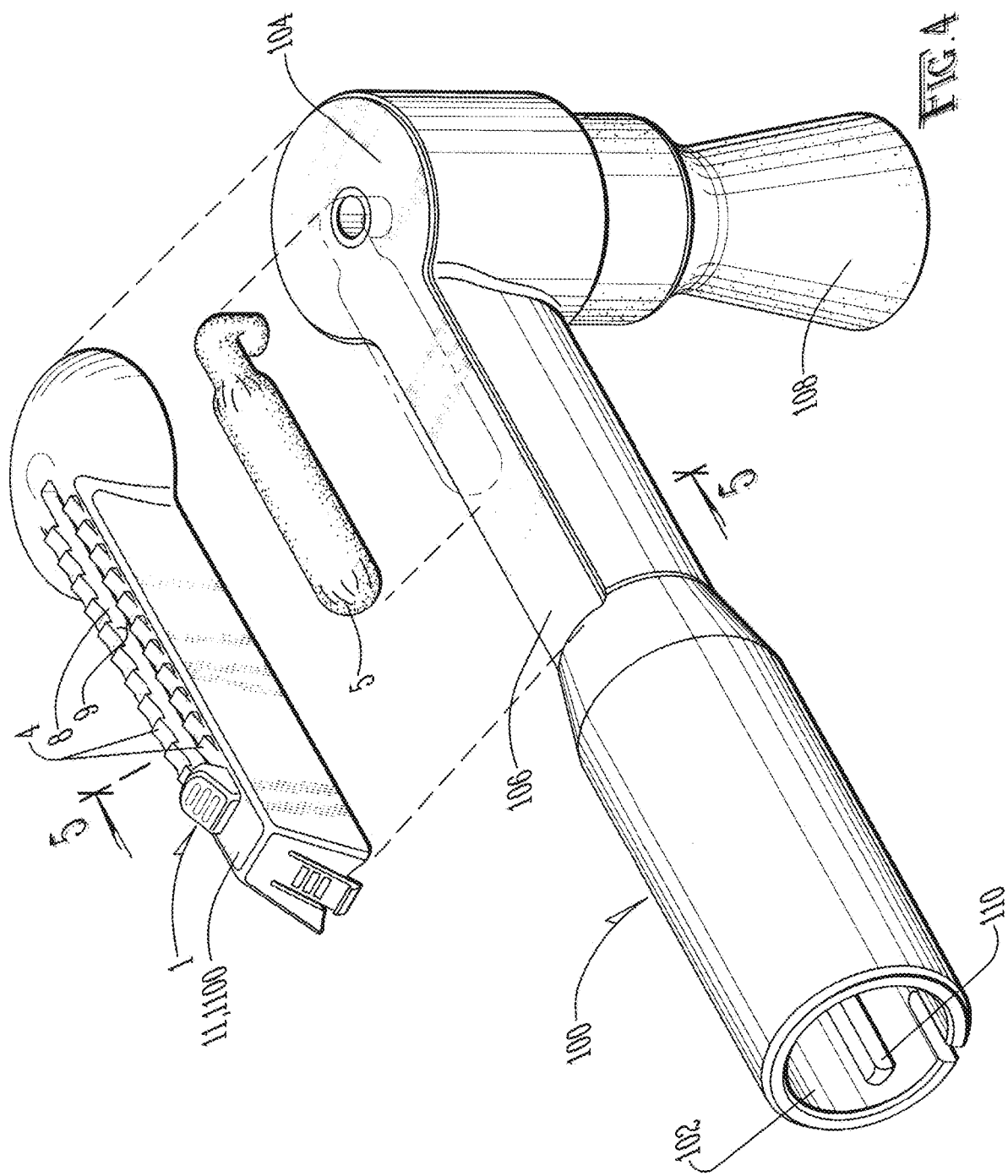
FIG. 4 is an exploded perspective view of an embodiment of the present invention which has an internal to the prophy angle disposable prophylaxis reservoir therein.

Now referring to FIG. 4, there is shown an embodiment of the present invention where a disposable and removable pouch 5 is located under a removable housing cap 11 or lid 1100, such that the disposable and removable pouch 5 can be removed when emptied and replaced with a full disposable removable pouch 5 for further delivery of prophylaxis media. Note that the lid 1100 could be just above the shaft 110 containing portion 102 of the prophy angle; however, it could extend to include the entire top of the cup end 104, thereby exposing top of the cup end 104 housing the gear head 112. Note FIG. 4 shows a top portion of the cup end 104; however, it should be understood that this is optional and in some embodiments of the present invention, removal of the removable housing cap 11 would result in exposing the gear head 112.

Figure 5:
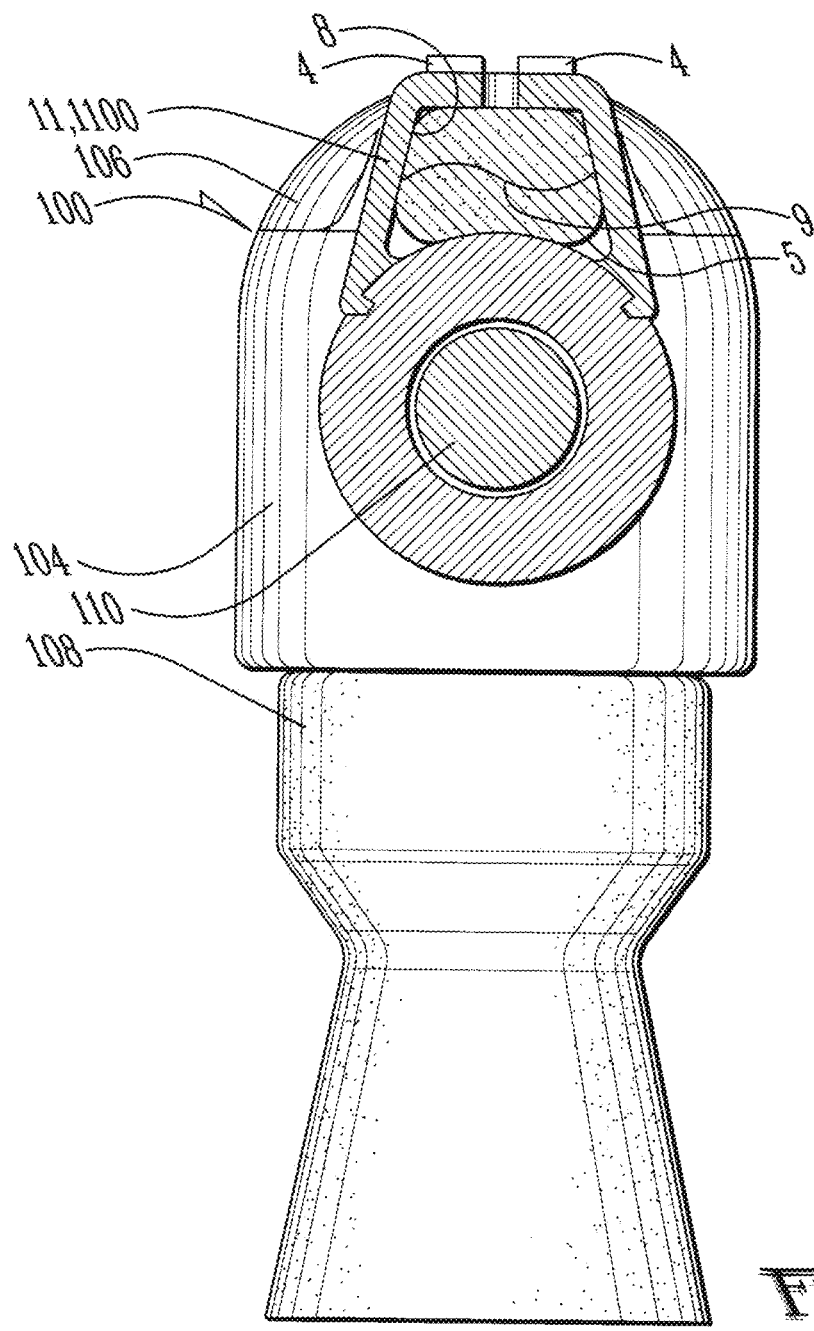
FIG. 5 is a cross-sectional view of the prophy angle of FIG. 4 taken on line 5-5 of FIG. 4.

Now referring to FIG. 5, there is shown a cross-sectional view of the prophy angle of FIG. 4 taken on line 5-5 after the removable housing cap 11 has been replaced or closed. The button 1 and paddle 3 are not shown so that the disposable removable collapsible cartridge 5 can be seen to be within the main body of the prophy angle.

Figure 6:
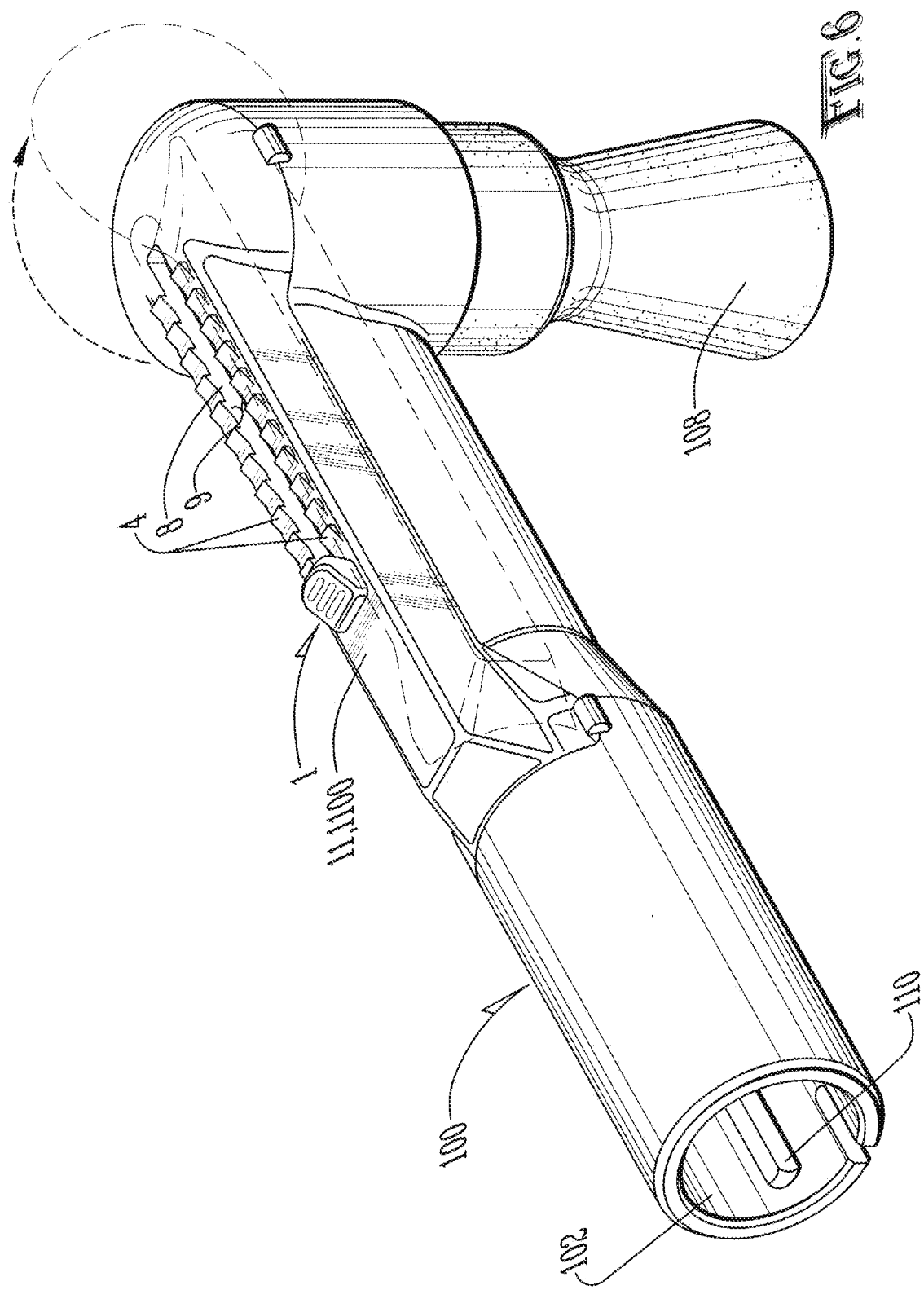
FIG. 6 is a perspective view of another embodiment of the prophy angle of the present invention where the dashed lines are phantom lines showing the top of the prophy angle in a pivoted up or open position where the direction of pivoting is shown by the dashed arrow.

Now referring to FIG. 6, there is shown an alternate embodiment of the present invention where the lid 1100 is not a snap-off lid, but a hinged lid. The dashed arrows show the direction of rotation of the lid 1100 when opened, and the dashed lines are phantom lines showing the location and orientation of the lid 1100 when in the open position. Items 11 and 1100 are shown in the figures as referring to the same structure. It should be noted that the structure of these is nearly identical, and the term "removable housing cap 11" is used primarily to suggest a removable cap, and the term "lid 1100" is intended to convey the notion of a pivoting door or lid. It is believed that a person skilled in the art will understand these variations.

It should be noted that the removable housing cap 11 and lid 1100 are shown as elevated above a normal top surface of a prophy angle. This is just one embodiment of the present invention. It should be understood that all of the structure disclosed above the top side 106 in FIG. 1 could be included in the prophy angle itself, and access to the cartridge 5 could be made through a hinged section of the top of the prophy angle; i.e., it should be understood that embedding the system of the present invention into a typical prophy angle housing is included within the scope of the present invention. It is believed that a raised or exterior removable housing cap 11 may be preferred for manufacturing ease.

In operation, the dental professional removes the removable housing cap 11 or opens up the lid 1100, (or opens the hinged section of the prophy angle top side where the present invention is embedded within the prophy angle) exposes the reservoir 7, inserts a collapsible cartridge 5, and then replaces the removable housing cap 11 or closes the hinged lid 1100 (section of the prophy angle top), and then attaches the prophy angle 100 to a prophy angle drive system and begins a procedure on a patient. It should be noted that the collapsible cartridge 5 could be incorporated by the manufacturer into the prophy angle 100, thereby eliminating the need for having the dental professional insert the collapsible cartridge 5. Prophylaxis medium is dispensed by occasionally incrementally moving the push button 1 forward (toward the cup end 104) through the cut-out channel 8. As the push button 1, coupled with the paddle 3 via connector 2, is pushed forward, the paddle 3 forces out of the collapsible cartridge 5, prophylaxis medium via connecting tube 6 and passes through the gear head pathway 10 and into the prophy cup 108, toothbrush or other tooth-engaging means where it is available for its intended use.

Definitions

The term "prophylaxis medium" is used throughout this description and is intended to be construed in the claims as including dentifrice, toothpaste or other abrasive or lubricating matter applied to a tooth.

The term "prophy angle" is used throughout this description and is intended to be construed in the claims as professional disposable device for polishing teeth.

Figure 7:
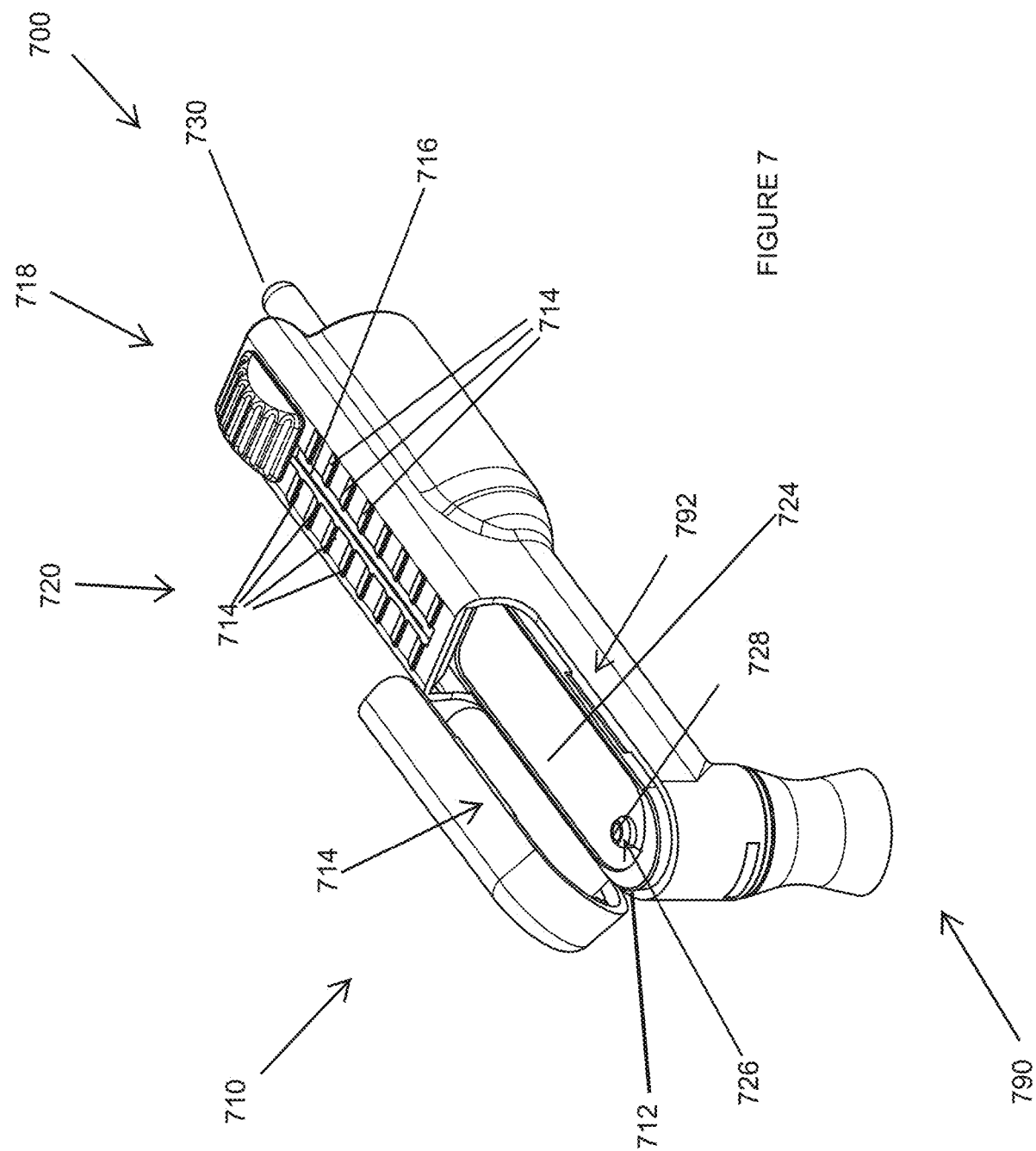
FIG. 7 is a perspective view of an alternate embodiment of the present invention which is also configured for rapid insertion of a prophy angle disposable prophylaxis cartridge, and which has external ridges for providing tactile and aural notification of dispensing of prophylaxis.
Figure 8:
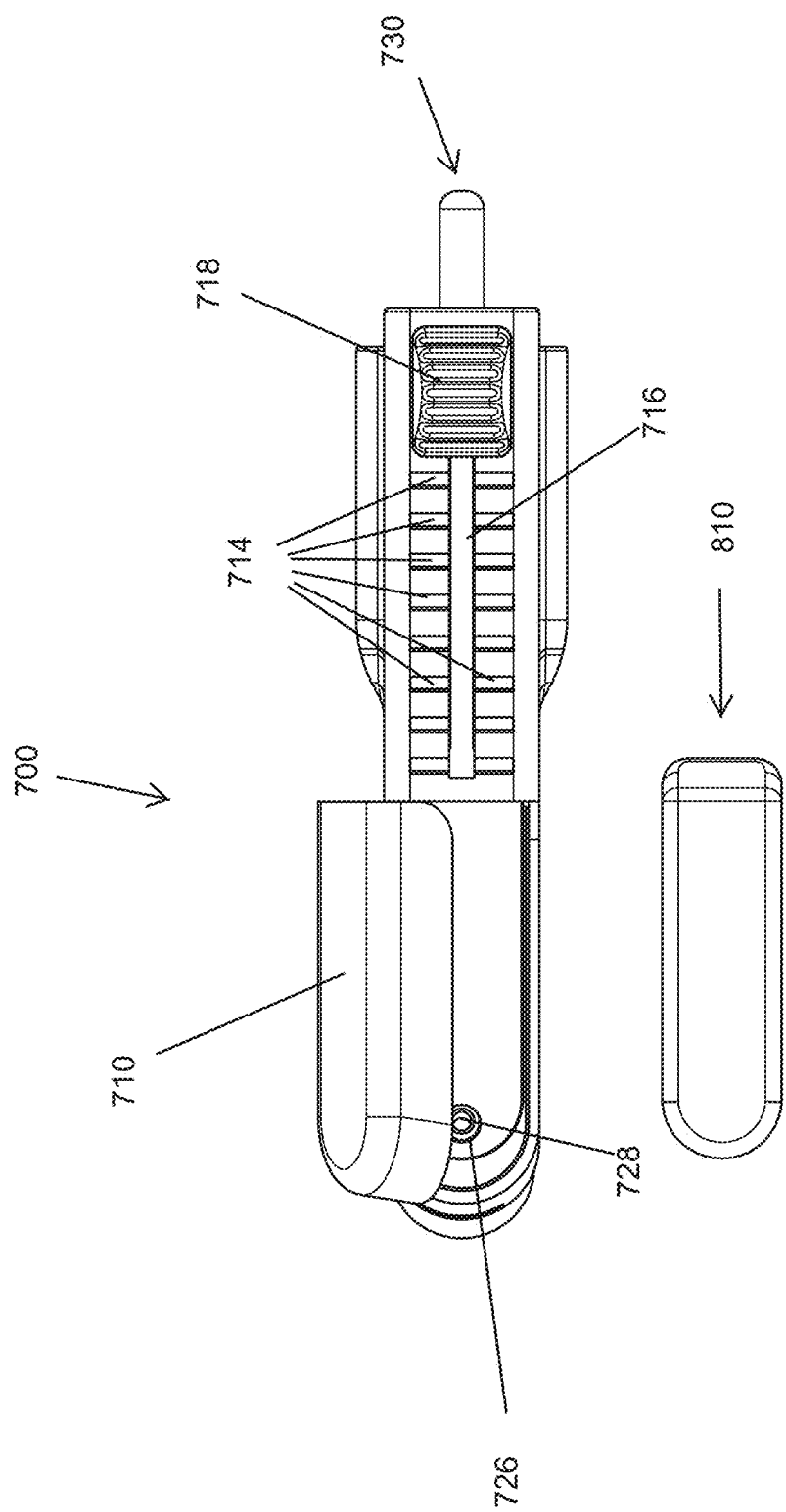
FIG. 8 is a top view of the embodiment of FIG. 7 also before insertion of the prophy angle disposable prophylaxis cartridge.

Now referring to FIGS. 7-11 and more particular to FIG. 7, there is shown an alternate embodiment of the present invention, generally designated 700, which includes a hinge top lid 710, a non-lid portion 720, a prophy cup 790, and a drive shaft 730 and drive mechanism cover 792. Hinge top lid 710 includes a hinge top lid hinge 712, and a hinge top lid opposing free side 714. Non-lid portion 720 with external ridges 74 thereon, which are configured to engage with, a central plunger handle 718, which is partially disposed in central slot 716. Portion 720 includes therein a plunger (not shown) which is configured with structure for engaging a prophylaxis cartridge 810 (FIG. 8), for the purpose of flattening the cartridge and expelling prophylaxis. Bottom 724 and lid 710 are in combination configured to retain a prophy angle disposable prophylaxis cartridge 810 (FIG. 8). Bottom 724 also contains an upwardly protruding cartridge piercing port 726 therein, with prophylaxis path 728 therein, which is in fluid communication with prophy cup 790. During the process of inserting the prophy angle disposable prophylaxis cartridge 810 (which may contain a foil or other easily pierce-able portion) and closing the hinge top lid 710, the port 726 pierces a portion of cartridge 810, allowing the prophylaxis therein to be able to flow to the prophy cup 790 when pushed by the plunger.

Now referring to FIG. 8, there is shown a top view of system of FIG. 7, in an open configuration prior to insertion of the prophy angle disposable prophylaxis cartridge 810, which is shown aligned with and disposed adjacent to its destination in the prophy angle 700 under the open lid 710. A portion of cartridge 810 is configured to be placed on top of and engage with piercing port 726 and open the cartridge 810 and thereby provide a path of prophylaxis to the prophy cup 790.

Figure 9:
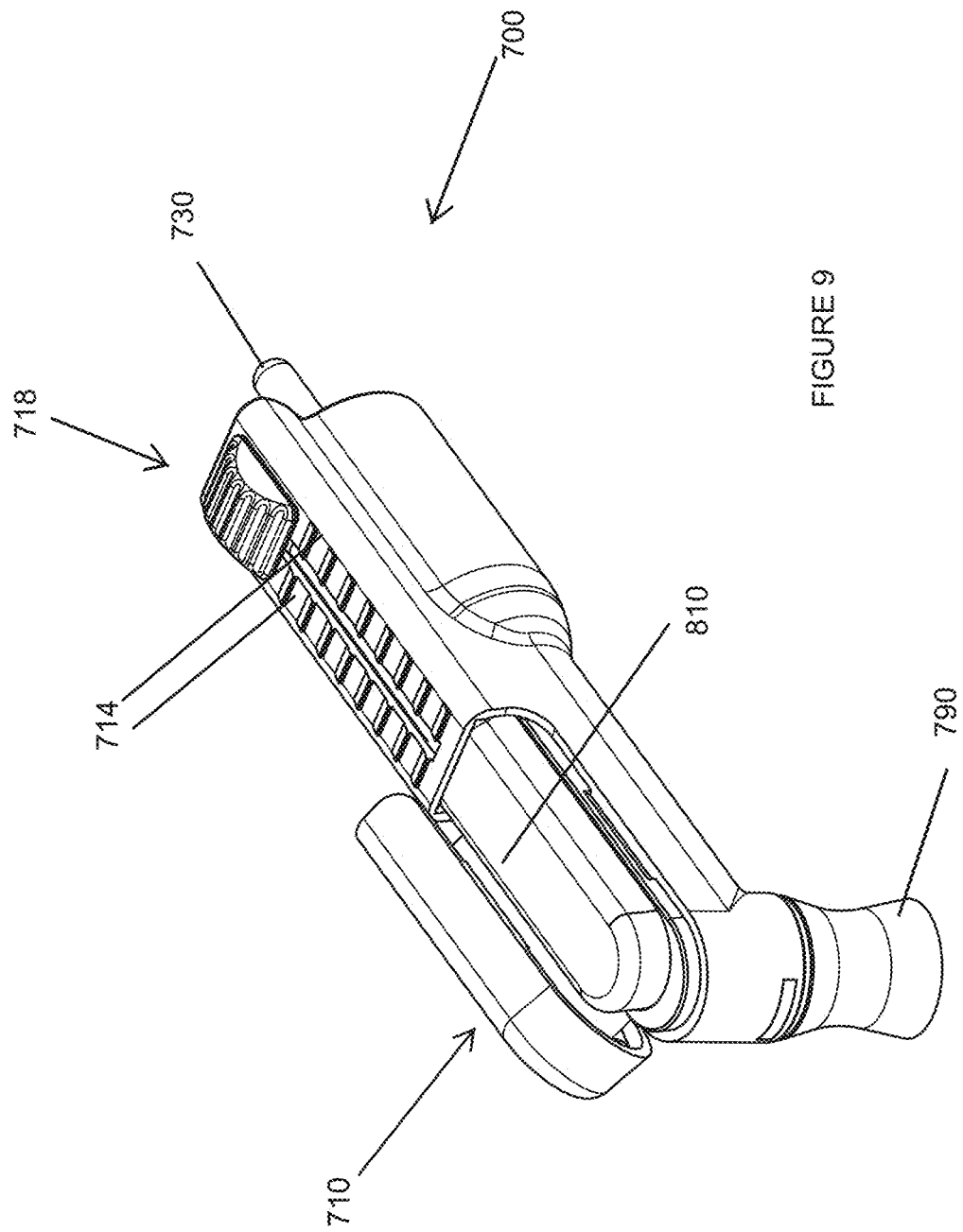
FIG. 9 is a view of the system of the present invention with the prophy angle disposable prophylaxis cartridge having been disposed inside the receiving chamber.

FIG. 9 shows a view of the system of FIG. 8 with the prophy angle disposable prophylaxis cartridge 810 disposed in the non-lid chamber portion 720 while the hinge top lid 710 is in an open orientation. The plunger 718 is shown in a non-final orientation.

Figure 10:
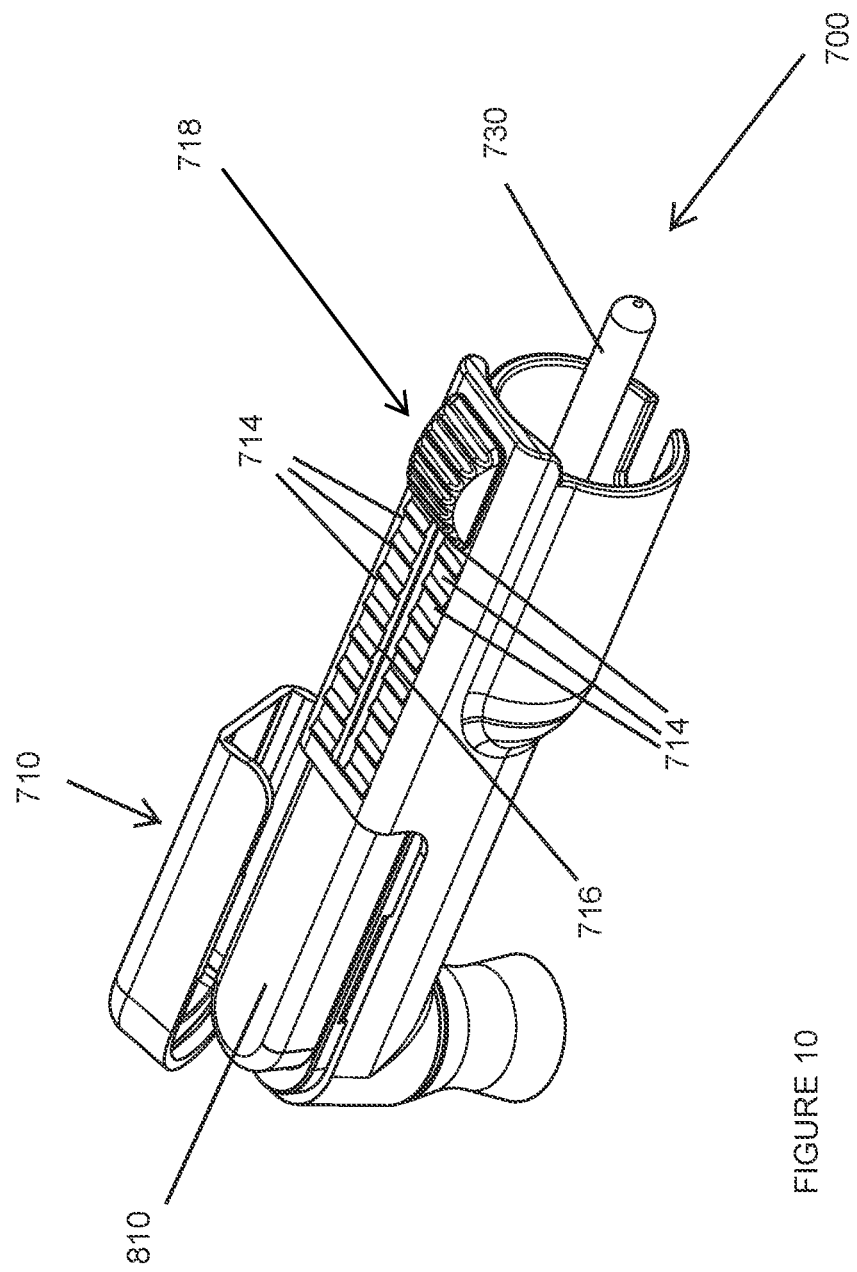
FIG. 10 is a view of the system of FIG. 9 from an alternate view point.

FIG. 10 shows an alternate view point of the system as shown in FIG. 9.

Figure 11:
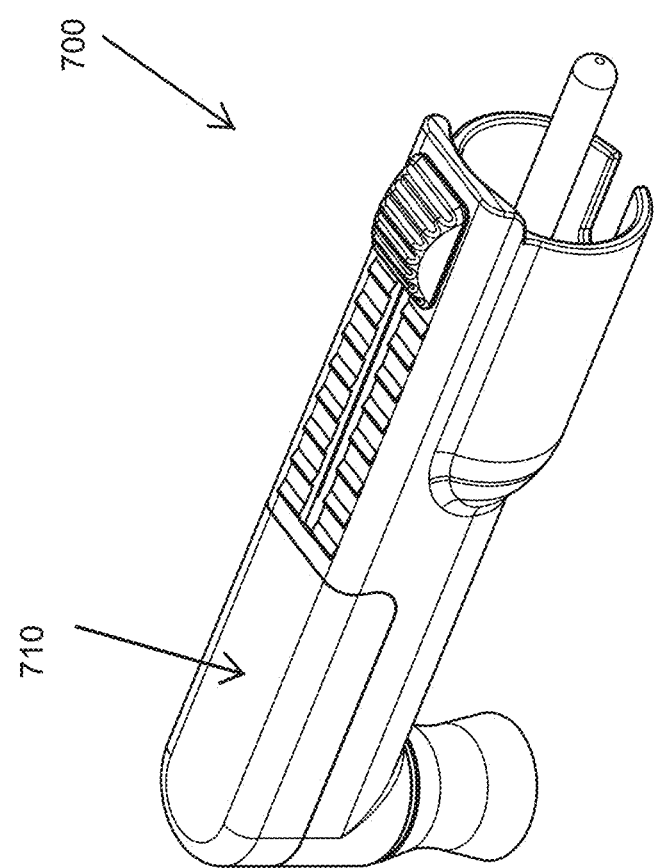
FIG. 11 is a view of the system of FIGS. 9 and 10 after the top 710 has been closed.

FIG. 11 is a view of the system of FIGS. 9 and 10 with the hinge top lid 710 in a closed orientation in which the now internal prophy angle disposable prophylaxis cartridge 810 cannot be seen.

Figure 12:
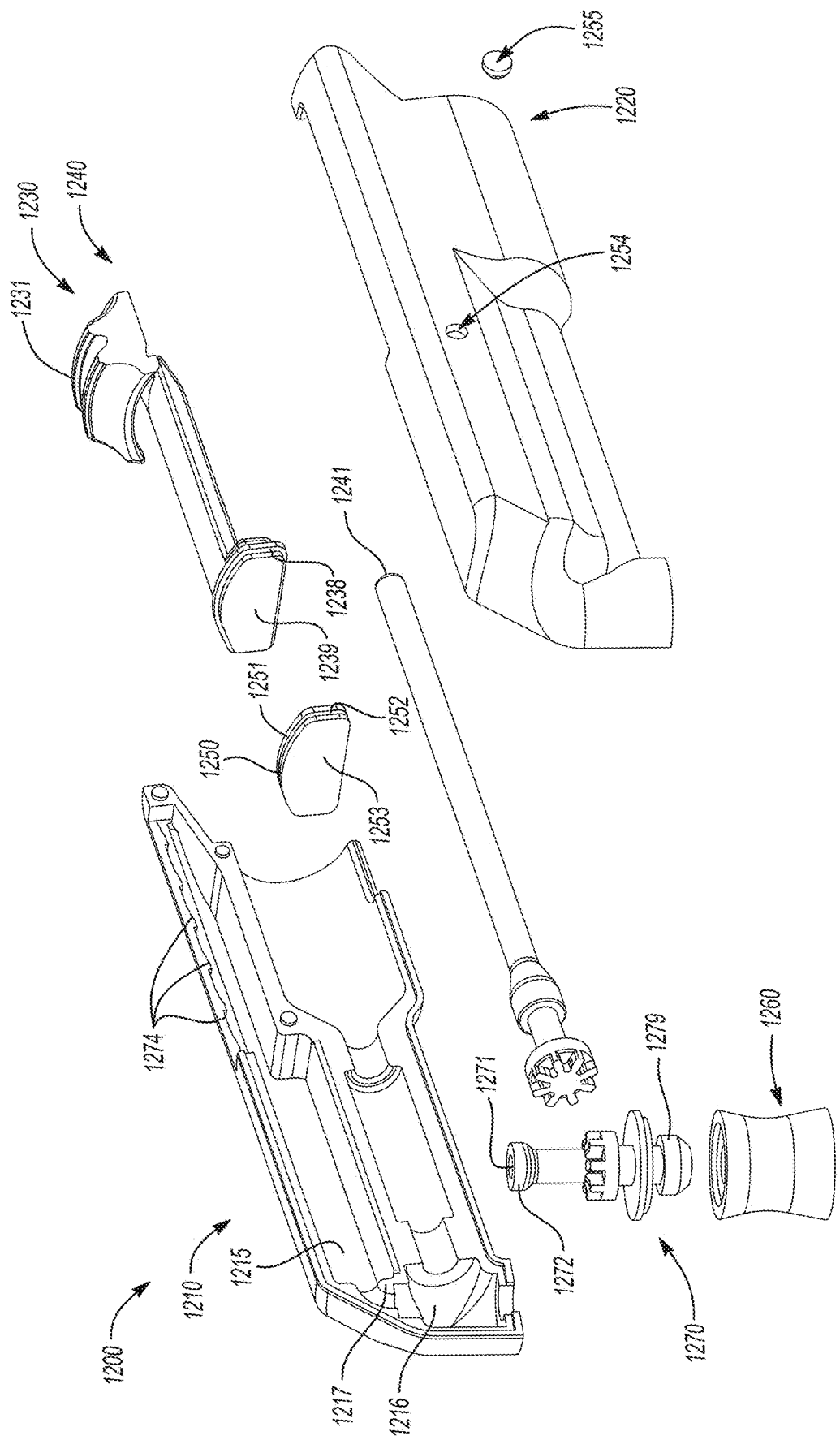
FIG. 12 is an exploded perspective view of an alternate embodiment of the present invention.
Figure 15:
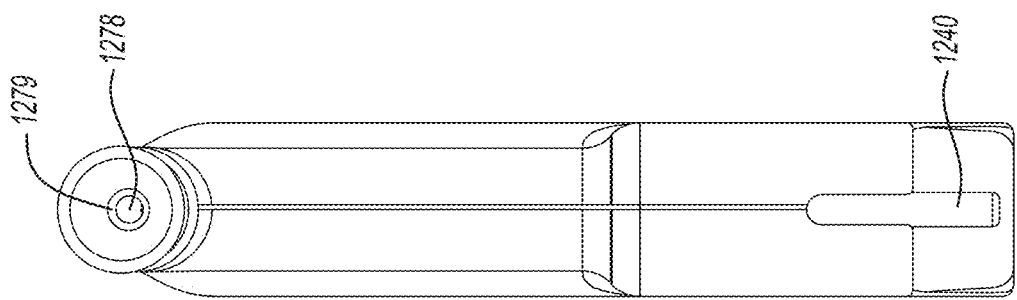
FIG. 15 is a bottom view of the system of FIG. 12.
Figure 14:
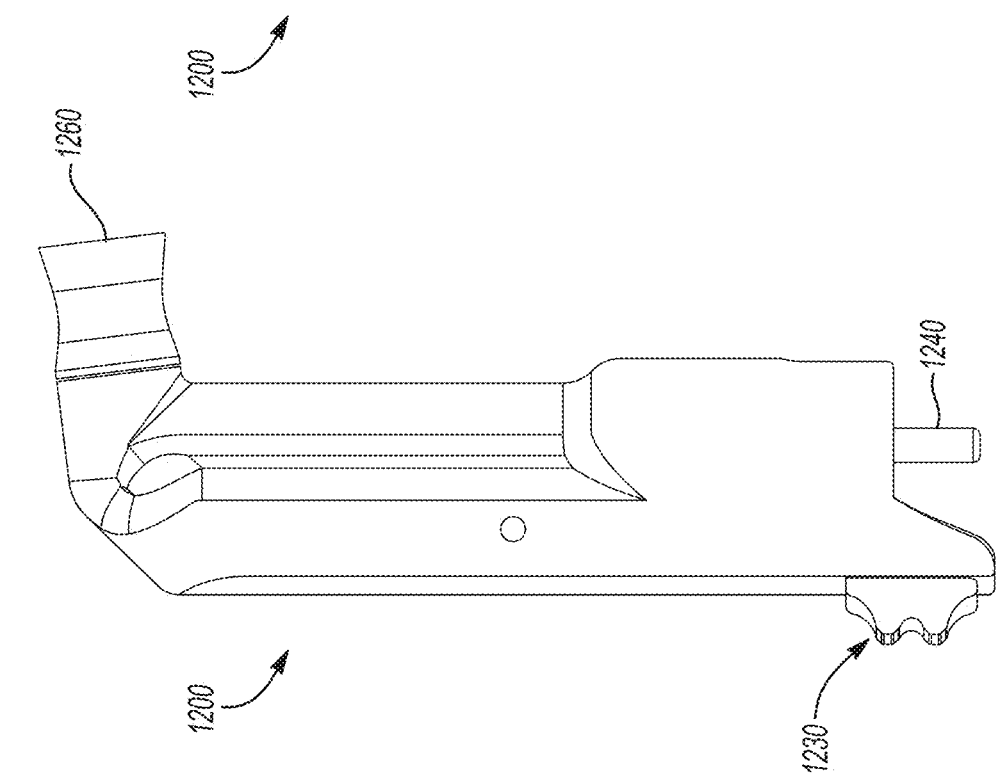
FIG. 14 is a side view of the system of FIG. 12.
Figure 13:
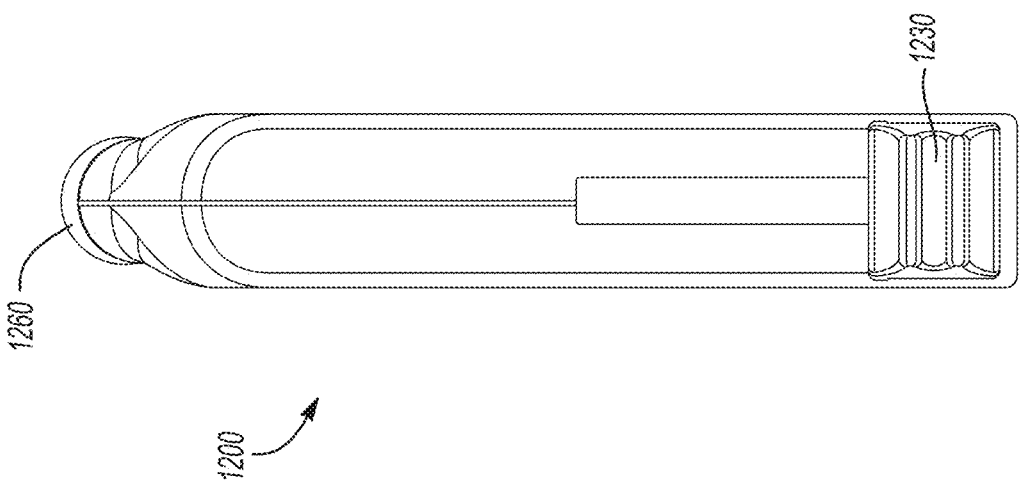
FIG. 13 is a top view of the system of FIG. 12.

Now referring to FIGS. 12-22 and more particularly FIG. 12 shows an alternate embodiment of the present invention, in an exploded view, without the presence of any dentifrice therein.

More particularly, FIG. 12 shows refillable cartridge-less prophy angle 1200 having a prophy angle first side 1210 and opposing prophy angle second side 1220. These may be configured to snap together. Prophy angle first side 1210 has a prophy angle first side dentifrice reservoir portion 1215, together with prophy angle second side dentifrice reservoir portion 1225 (FIG. 18) provide for storage of dentifrice 1280 (FIG. 20) therein. Prophy angle first side dentifrice channel portion 1217 and prophy angle second side dentifrice channel portion 1227 (FIG. 18) together provide an exit path of dentifrice 1280 to transverse geared shaft axial dentifrice channel 1271. Prophy angle first side gear chamber portion 1216 is also shown. Prophy angle second side 1220 is shown which will have similar if not mirror image structures to prophy angle first side 1210.

Finger actuated glide 1230 is configured to slide in response to manipulation to cause dentifrice 1280 to be expelled through tooth engaging portion 1260. Finger actuated glide 1230 includes finger actuated glide actuator 1231, finger actuated glide plunger tip end 1238 and finger actuated glide plunger tip end extension 1239. At the end of finger actuated glide 1230 is plunger cap 1250, which includes plunger cap mating side 1251, plunger cap void 1252, and plunger cap dentifrice side 1253.

Drive shaft 1240 is also shown having a drive shaft coupling end 1241. Transverse geared shaft 1270 is shown with a transverse geared shaft axial dentifrice channel 1271, transverse geared shaft top end 1272, and transverse geared shaft tooth cup mating portion 1279.

Now referring to FIGS. 13-17, there are shown various perspective views of the cartridge-less prophy angle 1200.

Now referring to FIG. 18, there is shown a cross section view of the prophy angle 1200 with the finger actuated glide 1230 in a location where it would be located before the process of first filling dentifrice and then expelling dentifrice 1280 would begin.

Figure 19:
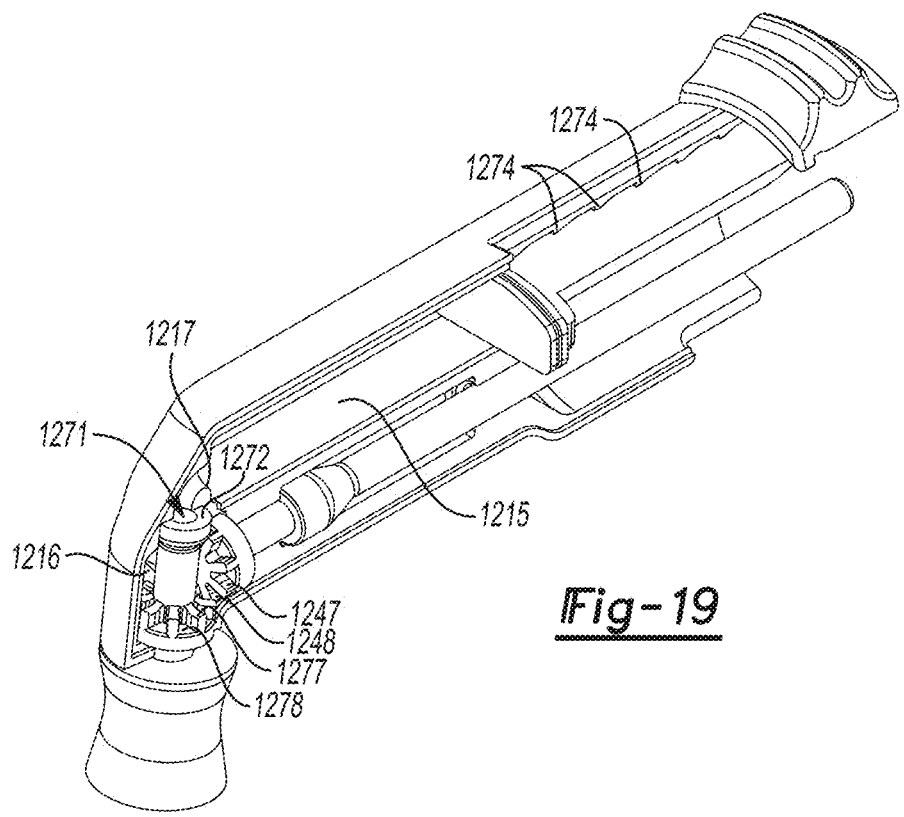
FIG. 19 is a cut-away perspective view of the system of FIG. 12 with a second portion removed to reveal internal components.

The process of filling the cartridge-less prophy angle with dentifrice can be accomplished as follows: With the finger actuated glide 1230 located as shown in FIGS. 12, 18, and 19 dentifrice can be pumped, pressed, forced or otherwise caused to be moved through the dentifrice input port 1254 in the side 1220 FIG. 12. The dentifrice will fill the void made up of first side dentifrice reservoir portion 1215 (FIG. 12), together with prophy angle second side dentifrice reservoir portion 1225 (FIG. 18) and then it will be forced through the transverse geared shaft axial dentifrice channel 1271 and the filling procedure will be over when the dentifrice is caused to flow out of the transverse geared shaft axial dentifrice channel outlet 1278 in transverse geared shaft tooth cup mating portion 1279 (FIG. 15) and into the prophy cup 1260. When it is full, the input port 1254 can be plugged with input port plug 1255, or other suitable means.

Alternatively, in some unlikely applications, the refillable cartridge-less prophy angle 1200 could, if so desired, be refilled by one of three methods:

a. connecting transverse geared shaft axial dentifrice channel outlet 1278 in transverse geared shaft tooth cup mating portion 1279 (FIG. 15) to a refilling source of dentifrice and pulling finger actuated glide 1230 backward from a forward position, to a position as shown in FIG. 18, so as to draw more dentifrice inside cartridge-less prophy angle 1200;

b. dentifrice could be pumped, pressed, forced or otherwise caused to be moved into refillable cartridge-less prophy angle 1200 through transverse geared shaft axial dentifrice channel outlet 1278, when the finger actuated glide 1230 is positioned as shown in FIGS. 12, 18 and 19;

c. the input port plug 1255 could be removed, then the finger actuated glide 1230 is pulled back, and the original filling process is repeated.

The transverse geared shaft 1270, with its transverse geared shaft gear ridge 1277, and transverse geared shaft gear valley 1278 are shown engaged with drive shaft gear valley 1248 and drive shaft gear ridge 1247. Drive shaft internal end 1249 is shown disposed adjacent to a central portion of transverse geared shaft 1270. Prophy angle second side 1220 is shown having structure similar to prophy angle first side 1210 such as prophy angle second side dentifrice channel portion 1227, prophy angle second side dentifrice reservoir portion 1225, and prophy angle second shaft retaining portion 1224.

Now referring to FIG. 19, refillable cartridge-less prophy angle 1200 is shown with prophy angle second side 1220 having been removed and before dentifrice 1280 is introduced into prophy angle first side dentifrice reservoir portion 1215 and prophy angle first side dentifrice channel portion 1217. See FIG. 20, which clearly shows dentifrice 1287, disposed in prophy angle first side dentifrice channel portion 1217.

Figure 20:
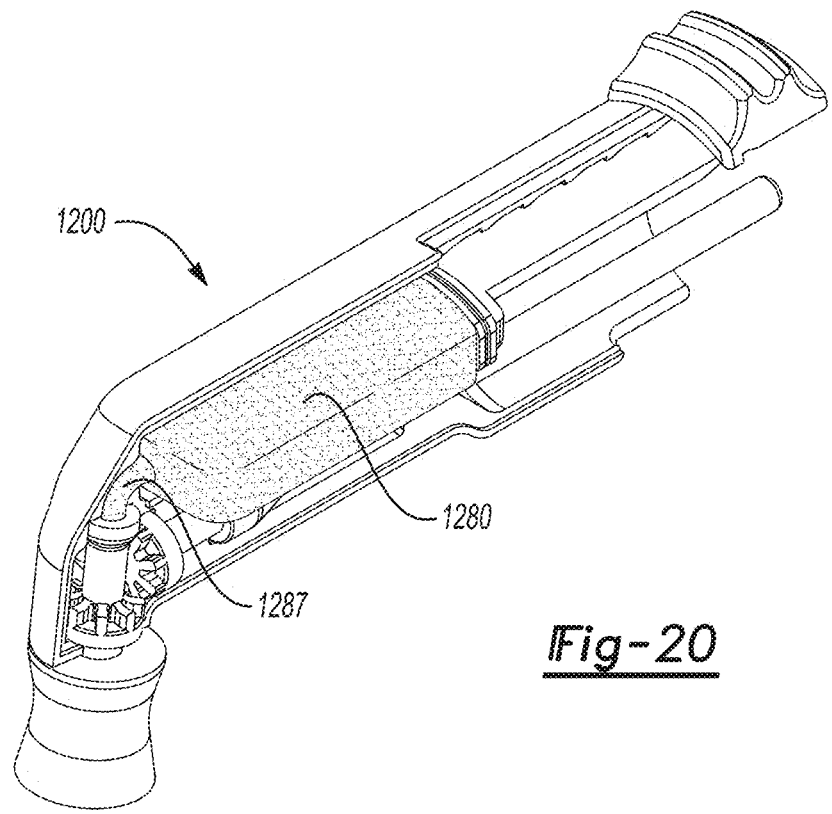
FIG. 20 is a cut-away perspective view of the system of FIG. 12 with the second portion removed to reveal internal components, with a representation of a quantity of dentifrice disposed therein.
Figure 21:
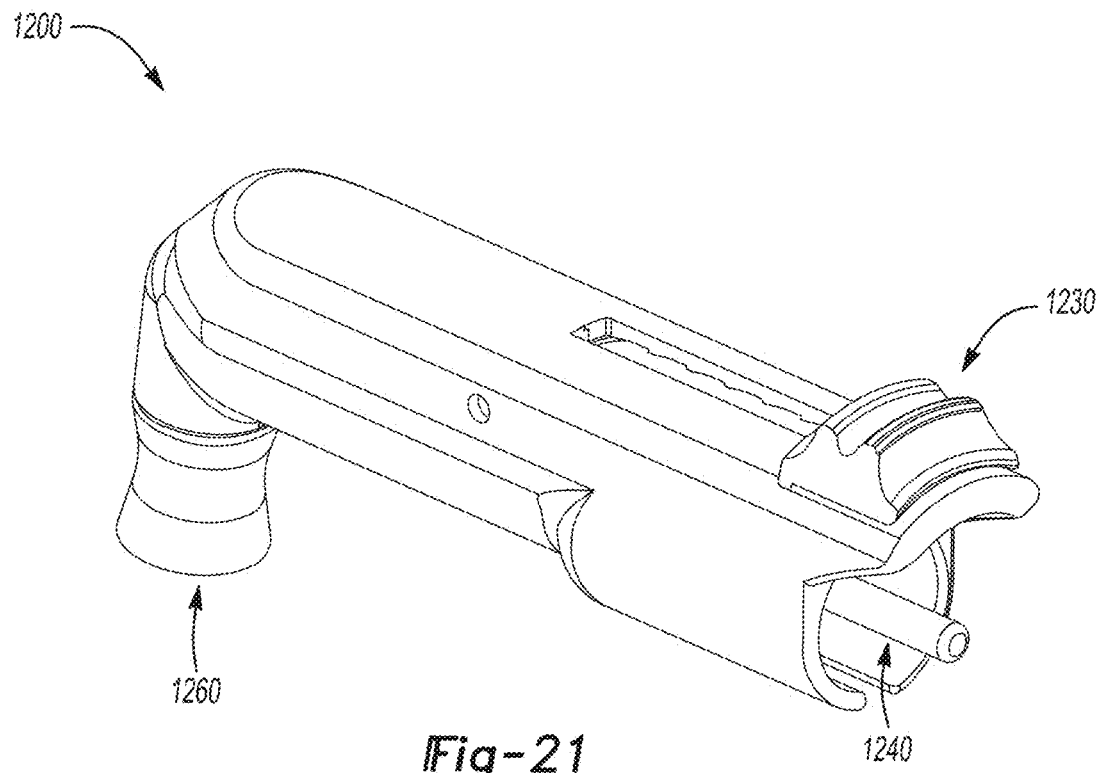
FIG. 21 is a perspective view of the system of FIG. 12.

FIG. 21 shows refillable cartridge-less prophy angle 1200 with both prophy angle first side 1210 and prophy angle second side 1220 in the fully assembled configuration, thereby blocking internal views as shown in FIGS. 19 and 20.

Figure 22:
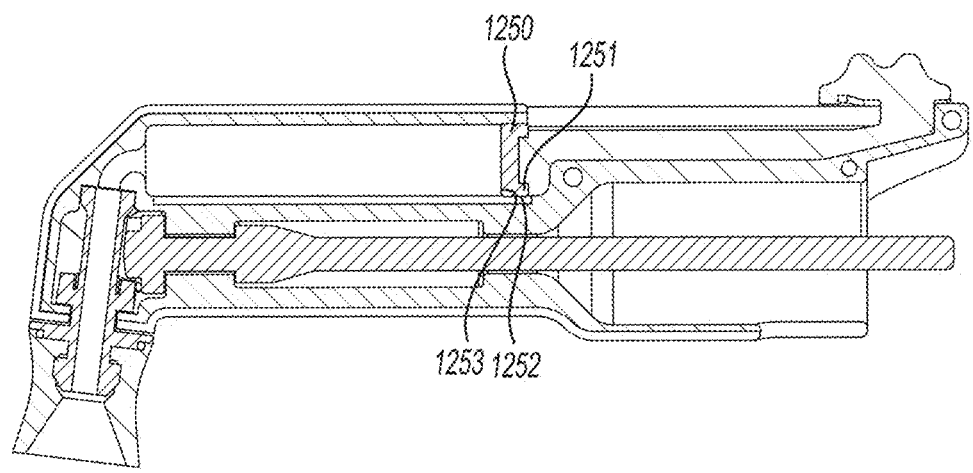
FIG. 22 is a cross-section view of the system of FIG. 12.

Now referring to FIG. 22, there is shown a cross-section view of the present invention which is helpful to see the plunger cap 1250 and how it interfaces with prophy angle first side dentifrice reservoir portion 1215, finger actuated glide plunger tip end extension 1239. An adhesive between finger actuated glide plunger tip end extension 1239 and plunger cap mating side 1251 might be desirable in some applications. Similarly, having surface features on finger actuated glide plunger tip end extension 1239 and plunger cap mating side 1251 to enhance coupling therebetween might be especially helpful if dentifrice is not externally forced into refillable cartridge-less prophy angle 1200 during refilling.

Figure 23:
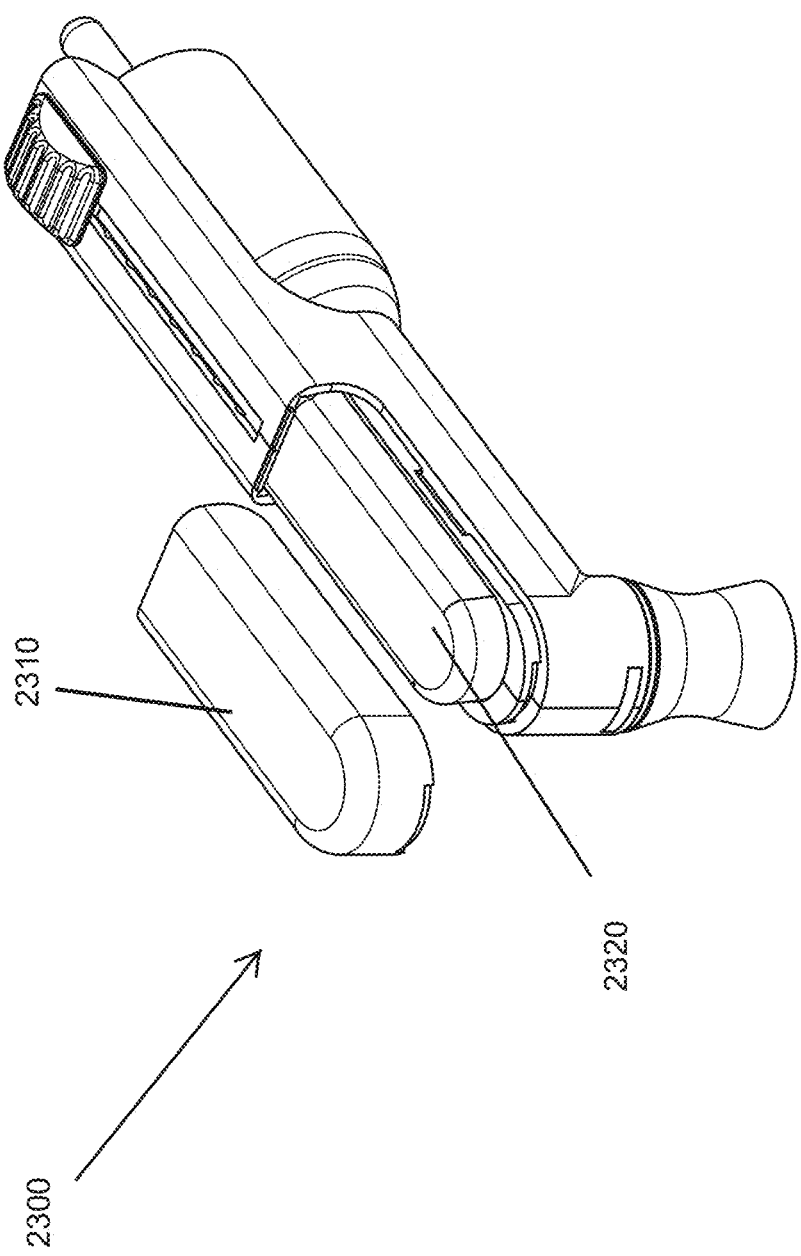
FIG. 23 is a perspective view of an alternate embodiment of the present invention with a snap on-off cover over a dentifrice cartridge.

Now referring to FIGS. 23 and 24, there are shown alternate embodiments of the present invention, more similar to the embodiments shown in FIGS. 7-11, except with a removable cartridge exposing cap 2310 or an end pivoting cartridge exposing cap 2410 configured to cover removable cartridge 2320. In both embodiments, the external ridges 74 from FIGS. 7-11 are instead similar to the internal feedback ridges 1274 shown in FIGS. 12-21.

Now referring to FIG. 25, there is shown another embodiment of the present invention, generally designated 2500, which has a body 2520, which does not have a hinged or removable lid, nor a cartridge, and therefore is similar to the embodiments of FIGS. 12-22 except that it includes exterior feedback notification ridges 2574. The body 2520 contains the prophylaxis material therein which is filled through a filling port 2522 which may be covered or plugged after filling is completed.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

I claim:

1. A method of delivering a variable and measured amount of dentifrice through a prophy angle comprising the steps of:
   providing a device for driving a plurality of detachable disposable prophy angles;
   providing a prophy angle with an exterior housing and a dentifrice reservoir therein;
   said exterior housing having an outer surface having a plurality of protuberances extending outwardly from said outer surface; said prophy angle further comprising an exterior member mechanically coupled to an interior member for dispensing dentifrice from said dentifrice reservoir when the exterior member slides over and cooperates with said protuberances,
   engaging with a human digit, the exterior member disposed on the exterior of the prophy angle and sliding the exterior member over and beyond a first protuberance so as to cause the mechanically coupled interior member inside the exterior housing to translate, and thereby force a first predetermined amount of prophylaxis medium out of an outlet of the dentifrice reservoir and into a prophy cup disposed on said prophy angle;
   detecting one of a first aural feedback notification and a first tactile feedback notification from said exterior member indicating passage of the exterior member beyond the first protuberance; and
   terminating further sliding of the exterior member in response to and after detecting the one of a first aural feedback notification and a first tactile feedback notification; so as to limit a total output of prophylaxis medium being provided into said prophy cup.

2. The method of claim 1 wherein said first predetermined amount of prophylaxis medium is an amount based upon filling a predetermine portion of the prophy cup or an amount based upon a number of teeth to be cleaned before translating the exterior member further to provide more prophylaxis medium into the prophy cup.

3. The method of claim 1 wherein said step of engaging, with said exterior member, a plurality of protuberances, simultaneously causes visual, tactile and aural notifications to occur.

4. The method of claim 1 wherein said exterior housing further comprises a first side and a second side with the dentifrice reservoir disposed therebetween and a dentifrice input port through said first side.

* * * * *